(12) United States Patent
Spiro

(10) Patent No.: US 8,310,761 B1
(45) Date of Patent: Nov. 13, 2012

(54) LENTICULAR PRODUCT

(75) Inventor: Steven Spiro, Chappaqua, NY (US)

(73) Assignee: Tracer Imaging LLC, White Plains, NY (US)

( * ) Notice: Subject to any disclaimer, the term of this patent is extended or adjusted under 35 U.S.C. 154(b) by 0 days.

(21) Appl. No.: 12/142,976

(22) Filed: Jun. 20, 2008

Related U.S. Application Data

(60) Provisional application No. 60/945,657, filed on Jun. 22, 2007.

(51) Int. Cl.
G02B 27/10 (2006.01)
B05D 5/06 (2006.01)

(52) U.S. Cl. ......... 359/620; 359/626; 359/900; 427/162

(58) Field of Classification Search .......... 359/619–622, 359/625, 741, 742, 599, 454–457; 235/454, 235/462.01, 462.05; 430/946; 427/162–169; 40/436
See application file for complete search history.

(56) References Cited

U.S. PATENT DOCUMENTS

| | | | |
|---|---|---|---|
| 3,520,588 A * | 7/1970 | Salyer et al. ................. | 430/946 |
| 5,330,799 A | 7/1994 | Sandor et al. | |
| 5,359,454 A | 10/1994 | Steenblik et al. | |
| 5,554,432 A | 9/1996 | Sandor et al. | |
| 5,699,190 A | 12/1997 | Young et al. | |
| 6,065,623 A * | 5/2000 | Hierzer et al. ................. | 215/230 |
| 6,256,149 B1 | 7/2001 | Rolfe | |
| 6,624,946 B2 | 9/2003 | Franko, Sr. | |
| 6,831,787 B1 | 12/2004 | Scarbrough et al. | |
| 6,974,080 B1 | 12/2005 | Goggins | |
| 6,985,296 B2 * | 1/2006 | Lipton et al. ................... | 359/619 |
| 6,995,914 B1 | 2/2006 | Conley et al. | |
| 7,002,748 B1 | 2/2006 | Conley et al. | |
| 7,609,450 B2 * | 10/2009 | Niemuth ....................... | 359/619 |
| 2005/0000128 A1 * | 1/2005 | Chen .............................. | 40/454 |

* cited by examiner

Primary Examiner — Ricky Mack
Assistant Examiner — Zachary Wilkes
(74) Attorney, Agent, or Firm — Leason Ellis LLP

(57) ABSTRACT

A lenticular product having a see-through window or lens is made by depositing a clear coating on a lenticular sheet. The lenticular product permits scanning a bar code or reading textual data that is printed on an image viewable through the lenticular product for animated, morphing, or stereographic effect. The window or lens of the lenticular product can also provide optical effects (e.g., magnification) in addition to the effects provided by the lenticular sheet. The lenticular product can be made by depositing fluid or resin in a one- or two-step process.

17 Claims, 4 Drawing Sheets

LENTICULAR PRODUCT

CROSS REFERENCE TO RELATED APPLICATIONS

The present application claims priority to, and hereby incorporates herein by reference in its entirety, U.S. Provisional Application 60/945,657, filed Jun. 22, 2007.

FIELD OF THE INVENTION

The present invention relates to lenticular products and, more particularly, to local surface modification of the patterned relief of a lenticular sheet for improving the rendering, readability, and detection of graphics such as (but not limited to) printed imagery, fonts, symbols, fine text, or bar codes.

BACKGROUND OF THE INVENTION

In the interest of a better understanding of the invention, certain conventions and practices within the trade may be appreciated.

Lenticular lenses, or lenticules, are typically cylindrical bodies having longitudinal axes and arranged in a parallel-axis array on a lenticulated face of a lenticular sheet. The face opposite the lenticulated face typically is substantially planar. Seen in cross-section, each lenticule has a vertex distal from the planar face, and adjacent lenticules intersect to define valleys proximal to the planar face. A lenticular height is defined between a first plane tangent to the lenticule vertices and a second plane tangent to the lenticule valleys. A lenticular pitch is defined between axes of adjacent lenticules along a raster axis perpendicular to the axes of the parallel lenticules.

The lenticular sheet typically is formed with a thickness of the sheet being substantially equal to a focal length of the cylindrical lenses or lenticules. The graphic resolution along the raster axis is then limited to the lenticular pitch. In the finished lenticular product, the planar face commonly carries a specially prepared and registered printed image. The image is most usually printed directly to the planar face of the sheet, but may also be formed on a separate substrate, and then aligned and adhered to the planar face.

A tradeoff between quality of focus and viewing angle is well known in the lenticular art. The influence of refractive index is also well understood. Lenticular sheets are often described according to the lenticular pitch in lenses per inch. A 150 lens-per-inch (LPI) array is colloquially understood to be a fine pitch. 75 LPI lens is considered an industry standard. A 40 LPI lens has a relatively coarse pitch, generally used for applications in which the lenticular item is to be viewed at greater than arm's length. The majority of commercial applications are currently served by lenticular sheets having proportions between 1.2 times as thick as the lenticular height, to twice as thick as the lenticular height. A single lenticule of a 75 LPI lenticular sheet is about 339 microns (13 mils) wide from valley to valley. In its most common present commercial form, a 75 LPI lenticular sheet will have a refractive index of around 1.57 and a thickness of around 469 microns (18 mils), therefore being about 1.4 times as thick as the nominal lens width.

It may be understood that some applications have called for more extreme proportions, as when a thin, conformable lenticular label is required, in which case the proportion may be 1:1 or less. Conversely, superior optical resolving power is often sought after in autostereoscopic "3-D" display, and in this case the ratio of thickness to lens width may be 3:1 or greater. The preceding values descriptions are intended to characterize underlying principles, and identify the most readily available commercial materials in the current trade, and should not in any way be taken to limit the scope of the invention.

Lenticular sheets may be formed by any suitable method. For example, U.S. Pat. Nos. 5,330,799 and 5,554,532 to Sandor et al. describe a lenticular system in which lenses are formed upon a flat carrier sheet in a forming process which is commonly known as "cast film" lenticular. Sandor et al. describe lenses formed in local areas by forming and curing fluid material over the desired image areas.

However, the cast film process has proven costly and has not been widely adopted. Instead, high-speed extrusion is currently the prevalent practice in the trade. Extrudable polymer materials suitable for use within the invention include amorphous polyethylene (APET), or glycol-modified polyethylene terephthalate copolyester (PETG). Additionally, formulations of polycarbonate, acrylic, styrene, and other polymers can also be used to form the prefabricated lens array by extrusion. It is recognized that such thermoplastic polymer materials are also generally amenable to other manufacturing methods, such as embossing or various other molding and forming techniques.

High-speed extrusion is cost-efficient for large runs, but requires forming cylinders that are individually expensive. Thus, the extrusion method is not economically feasible for making customized layouts of lenticulated surfaces in any arbitrary combination with unlenticulated regions. Nevertheless, there are many applications for lenticular lenses in which an ability to provide such customized layouts would be advantageous. Although alternate manufacturing methods such as cast film and injection molding may be used to prefabricate a patterned combination of lenticulated surfaces and smooth optical windows, such methods increase the cost of the finished product above what is economically practicable.

In the practice of lenticular printing, it has been discovered that the ribbed cylindrical relief inhibits the accomplishment of certain common and regularly sought-after tasks within the field of printed graphics. For example, the optical effect of the lenticular overlay has a disadvantageous effect upon the accurate detection of encoded data. The material currently having the widest use in the trade has 75 cylindrical lenses per inch (LPI). This pitch is significantly broader than the resolution of conventional offset printing. Indeed, a human reader cannot discern fine text that has been visually expressed via the lenticular overlay, as the maximum resolution on one axis is characteristically constrained by the lens pitch. Analogously, in many cases bar codes cannot be correctly read, owing to distortions imparted by the many cylindrical lenses. Thus, it may be appreciated that it might be desirable to make text, graphics or other indicia visible at a higher linear resolution than can be achieved by viewing a printed image through the surface optics of a lenticular lens sheet.

A particular problem identified in the lenticular trade has been the method's historical incompatibility with bar coding. The fine lines used in the encoded data often exceed the resolution available in standardized lenticulated sheet. Prior solutions to this specific problem include the use of 150 LPI or finer lenses, as suggested in U.S. Pat. No. 6,424,467 to Goggins, or disposing the bar code so that the bars in the barcode are oriented in a crosswise direction, as in U.S. Pat. No. 6,974,080, also to Goggins.

However, in the invention described in U.S. Pat. No. 6,424,467, such fine lenses are difficult to cost-effectively manage in a production environment. Furthermore, for a given optical design, the pitch of the lenticules and the thickness of the sheet are directly proportional. Therefore, end users often avoid lenses thinner than 75 LPI because, unless mounted in a frame or on a rigid substrate, such thin lenses are widely believed to be prone to unwanted flexure, a property which is known to disrupt the lenticular effect.

In U.S. Pat. No. 6,974,080, the magnification effects of the lenses are obviated only if the scanning device is held absolutely perpendicular to the lens sheet. It may therefore be appreciated that there remains a general desire both for more flexibility in the local optical features and resolution properties of lenticular sheet, and more particularly for improving the rate and reliability of the scanning of machine-readable optical indicia, such as bar codes.

SUMMARY OF THE INVENTION

Accordingly, it is desirable to combine bar code graphics or fine text directly with a lenticular lens overlay, yet maintain the practical function and readability of the bar code or fine text within a lenticular application.

Additionally, the proportionally deep surface relief of standard lenticular arrays can deter simple tasks such as the reliable application of a pressure-sensitive label, owing to the labels' tendency only to make direct contact with the lenticular sheet at the lens vertices. Thus, it is desirable to provide a structure by which such labels can be applied to a lenticular sheet.

It may be appreciated in a broader sense that it might be useful to locally and electively effectively subvert the surface relief that elsewhere in the image sheet imparts a lenticular optical effect, yet leave that effect in place in the remaining areas of a prefabricated lenticular material.

According to the present invention, a transparent, initially fluid material is applied as a coating to the lenticulated surface of the lenticular lens sheet. The fluid material may be a radiation responsive adhesive (such as a UV-curable resin) applied locally in a "spot" area. By curing the coating, the original optical power of a subset of lenticules is subverted by locally altering the surface relief of the lenticulated surface.

In one embodiment, a curable fluid material is applied to the lenticulated side and contained within a physically delimited perimeter by a mask. The fluid material fills the valleys between the lenses and is retained at a perimeter of any arbitrary shape by the mask. The mask is then removed from the lenticulated sheet, leaving an area in which the valleys between the lenses have been substantially filled. The method creates a region having an optical surface that does not exhibit the same periodic cylindrical ribbing as the lens substrate.

In another embodiment, the mask is disposed upon a screen-printing screen. The screen carrying the mask is located against the lenticulated side of a prefabricated lenticular sheet, the sheet typically being an extruded polymer array of linear cylindrical or acylindrical geometry. The transparent material is screened onto a region of the ribbed surface lenticular array. The mask is then removed from the lenticular lens sheet, leaving an area overlaid with the fluid transparent material. Depending on the material selected, the transparent material is then either actively cured, or simply allowed to cure without direct activation.

In another embodiment of the invention, the lenticular sheet is preprinted with a graphic image by a process such as lithographic printing. The printed image content is composed to include a bar code region, the bar code region including the actual printed bar code data as well as any accompanying alphanumerics, as well as any uncoded border areas. The bar code will typically have been reverse-printed to the flat, unlenticulated side of the lens sheet, so that the orientation of the data is right-reading from the lenticulated side.

The mask is typically devised to be equal to or larger than the bar code, and applied to a printing screen. The masked screen is placed in intimate contact with the preprinted lenticular sheet and in substantial registration with the relevant aperture in the mask. Transparent material, which may, for example, be a radiation-curable ink, adhesive or lacquer, is then extruded through the fine holes into the well defined by the lenticulated surface and by the delimited perimeter of the relevant mask aperture. The relevant mask aperture may be rectangular in shape and may correspond in scale and proportion to the bar code region.

Once the mask is removed, the material flows out to a nearly planar surface. Typically, any localized peak or residual screen pattern will effectively disappear owing to the fluid material's tendency to seek equilibrium. The material is then cured in this state, i.e., when the fluid exhibit substantial optical flatness. The cured transparent material thus provides a clear, durable window through which the underlying bar code can be read.

In another embodiment of the invention, two masks and two differing fluid materials are employed having differing initial viscosities. A first mask is formed in the shape of a linear border having a predetermined line width, and the second mask is commensurate with the region contained within the linear border of the first mask. The first, higher viscosity material is passed through a screen to form a raised perimeter that adapts to the lenticulated surface with relatively little bleeding into lens valleys. The first material may then be cured.

A second screen may then be placed in registration with the raised linear contour provided by the application of the first material to the lenticular sheet. Highly fluid, relatively low viscosity curable material is then introduced into the walled region. The second material is allowed to flow out to a high gloss surface. If the walled region is filled to a level meniscus, the cured material will correspond to an optical window. Alternatively, properties of the first and second materials may be matched to produce a convex meniscus or a concave meniscus. A wide range of effects may be obtained by these methods.

The invention may also provide mechanical advantages apart from utility as an optical aperture through to the back surface of a lenticular lens. For example, the above processes may be used alone or in combination to provide a plane surface for additional printing or surface decoration. Similarly, the invention may be used to provide a flat land upon a lenticular lens sheet in order to improve the adhesion of a separately devised label, sticker, price tag, or discretely printed self-adhesive bar code.

These and other objects, features and advantages of the present invention will become apparent in light of the detailed description of the best mode embodiment thereof, as illustrated in the accompanying drawings.

DETAILED DESCRIPTION OF PREFERRED EMBODIMENTS

Figure 1:
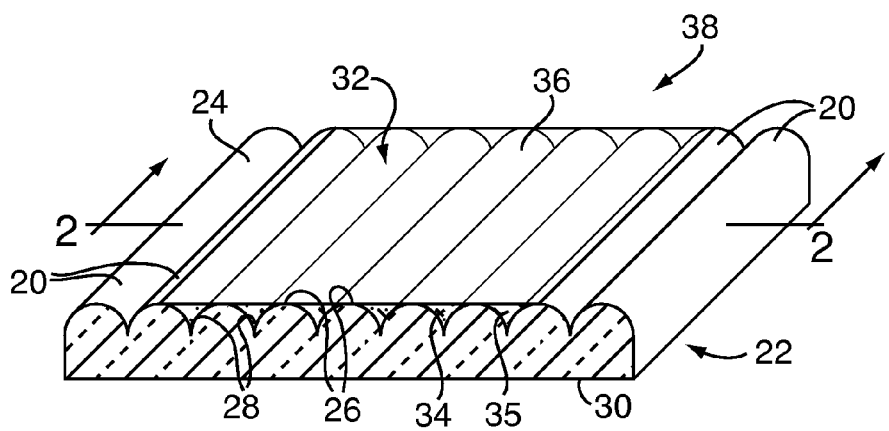
FIG. 1 is a perspective view of a lenticular product in which a lenticular sheet has been optically modified by depositing a coating on a portion of the lenticulated surface so as to provide an effectively flat window in a plane coincident with the vertices of the lenticules in the array, according to one embodiment of the present invention.

In view of the foregoing discussion of the art and the summary of the invention, and referring now to the drawings and the specifics particular to the present invention, FIG. 1 shows a plurality of lenticules 20 formed on a transparent lenticular sheet 22. The plurality of lenticules 20 are arrayed in parallel to form a lenticulated surface 24 having vertices 26 and valleys 28. The lens sheet also includes an unpatterned surface 30. The unpatterned surface 30 is most typically planar, but may also be curved around one or more axes if the transparent lenticular sheet 22 itself is contoured conformally to a cylindrical, conical, or other achievable geometrical shape.

In FIG. 1, a portion 32 of the lenticulated surface 24 has been modified by depositing an amount of a substantially clear coating 34 sufficient to fill the valleys 28, thereby forming a filled region 35 having a surface 36 that is substantially tangent to the vertices 26 of the lenticules 20.

If the coating 34 is a 100% solids radiation curable adhesive, subjected to actinic radiation, it may be understood that the curing process will result in the surface 36 being substantially flat, as there should be substantially no loss in material volume in the curing stage. Once the coating 34 is cured, the process results in a windowed lenticular product 38.

Figure 2:
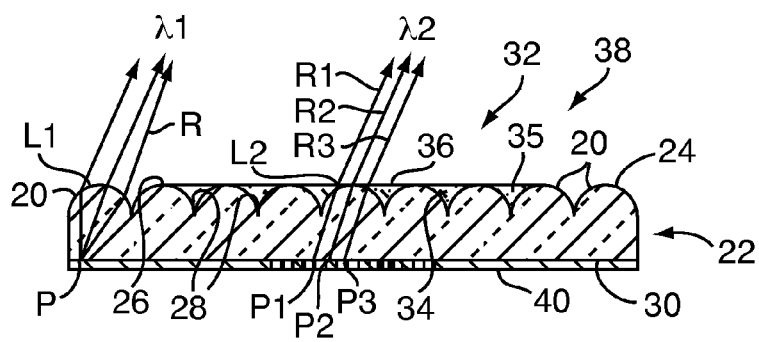
FIG. 2 is a sectional view showing an optical nulling effect that occurs when the lenticular sheet and the coating of FIG. 1 are chosen to have a common refractive index.

FIG. 2 demonstrates the optical results of the arrangement exemplified in FIG. 1. Varied graphic material 40 has been disposed upon the unpatterned surface 30 of the windowed lenticular product 38. Light departing from a lenticule L1 expresses a conventional lenticular effect; namely, light radiated diffusely from a point P is significantly brought into near parallelism, as arrows indicate at λ1, by the influence of the lenticular optic 24.

Given any variation in the graphic material underlying an individual lenticule 20, this controlled steering of light causes the appearance of the observed lenticule 20 to vary with the observer's angle of view. The color and tone present at the point P are optically spread over the most part of the lenticule aperture. This may be a desired effect in some part of an image, and expressly imparted at the expense of back plane resolution. However, the same property may be considered disadvantageous in another region with differing graphical or physical requirements.

In addition to the direct diminishment of attainable resolution, in any practicable lenticular system there is a significant amount of aberration owing to the intrinsic geometry of the simple lenses. In actual detection of the light transmitted from the lens, irrespective of whether that detection is by a living observer or electronic device, there will be mapping errors, which cause a shortfall of ideal point-to-point data correspondence. Skewed marginal ray R suggests one such mapping error. It may therefore be appreciated that both magnification and aberration can contribute to the precise and reliable observation or detection of data.

In contrast, it may be seen by light at λ2 that there is a direct and reliable mapping of points P1, P2, and P3 into parallel paths R1, R2, and R3. Because the effect of lenticule L2 had been expressly undermined by the application of transparent coating 34, there is no skewing of rays and the regular property of the set of rays is preserved.

Figure 3:
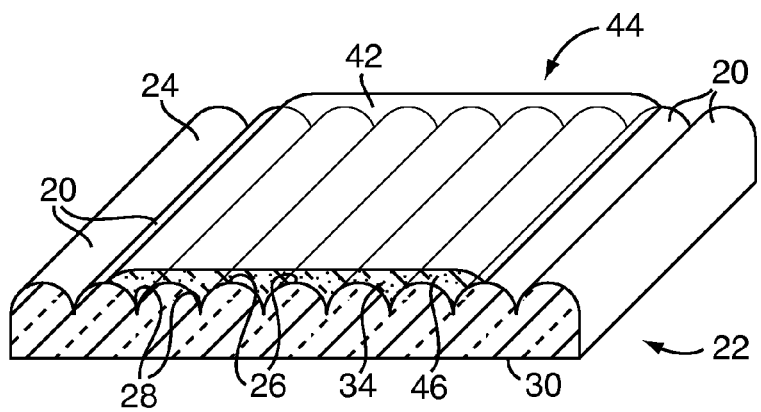
FIG. 3 is a perspective view of a lenticular product in which a lenticular sheet has been optically modified by depositing a coating on a portion of the lenticulated surface so as to provide an effectively flat window in a plane elevated above the vertices of the lenticules, according to another embodiment of the present invention.

FIG. 3 shows a variation of the invention in which a substantially planar raised window surface 42 has been created somewhat above the linear lenticule vertices 26 to create a raised-window lenticular product 44. Raised resin field 46 is composed of curable coating 34 and includes substantially flat land 42.

Such a variation may be imparted by, for example, employing for the coating 34 a resin, which in its fluid state exhibits a relatively higher viscosity than the resin used for coating 34 as depicted in FIG. 1. It may also be promoted by using a relatively lower viscosity resin, while increasing effective surface tension through the application of an electrostatic field. In any case, the invention should be understood to include a raised field of material, and not simply a level filling of the valleys 28 between the lenticules 20.

Figure 4:
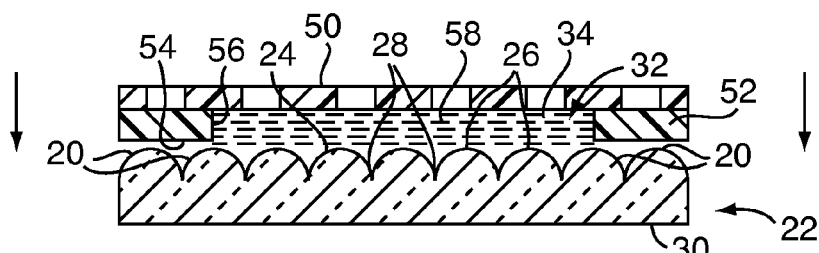
FIG. 4 is a sectional view of a printing screen carrying a mask of a predetermined design being used to deposit the coating on the lenticular sheet of FIG. 1 or FIG. 3.

FIG. 4 illustrates one method of applying the coating 34. Concurrent reference may also be made to FIG. 5. An apertured printing screen 50 is furnished with a mask 52. The mask 52 has a face 54 and an inner sidewall 56, and allows permeation of coating 34 in fluid form through the screen 40 in a predetermined area corresponding to the portion 32 of the lenticulated surface 24, while blocking fluid permeation elsewhere. The mask 52 can be formed of any suitable material, but is advantageously chosen to be of sufficient thickness and resiliency so as to adaptively conform to the lenticules 20, particularly the valleys 28. A higher degree of conformability in the mask 52 generally results in less bleeding of the fluid coating 34 beyond the masked portion 32 of the lenticulated surface 24.

Figure 5:
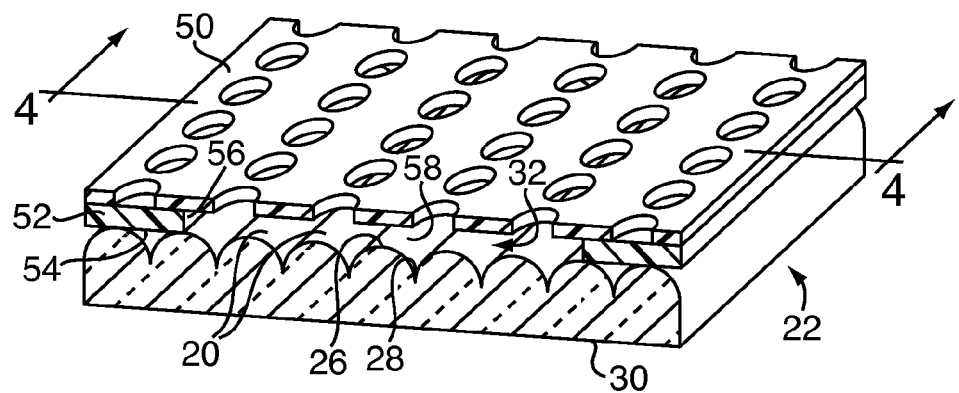
FIG. 5 is a perspective view of the screen and mask assembly of FIG. 4 in intimate contact with the lenticulated sheet.

Prior to applying the fluid coating 34, the mask face 54 is disposed in a plane parallel to the plane of the linear lenticule vertices 26, and then brought to bear against the lenticules 20 of the lenticular sheet 22, as suggested by the bold arrows in FIG. 4, and by the completed arrangement shown in FIG. 5. The apertured printing screen 50 operates cooperatively with the mask 52, and particularly with the mask sidewall 56, to define a well 58 into which the fluid coating 34 may be introduced in a controlled manner.

The coating 34 is then introduced in fluid form through the screen 50 into the well 58 defined by the mask 52, using force typically imparted by a blade or roller (not shown). Once the well 58 is acceptably filled, the screen 50 and the mask 52 are removed from intimate contact with the lenticules 20. The coating 34 is then actively or passively brought to a cured (solid) state, thus forming a clear optical window from the portion 32 of the lenticulated surface 24 to the unpatterned surface 30.

Figure 6:
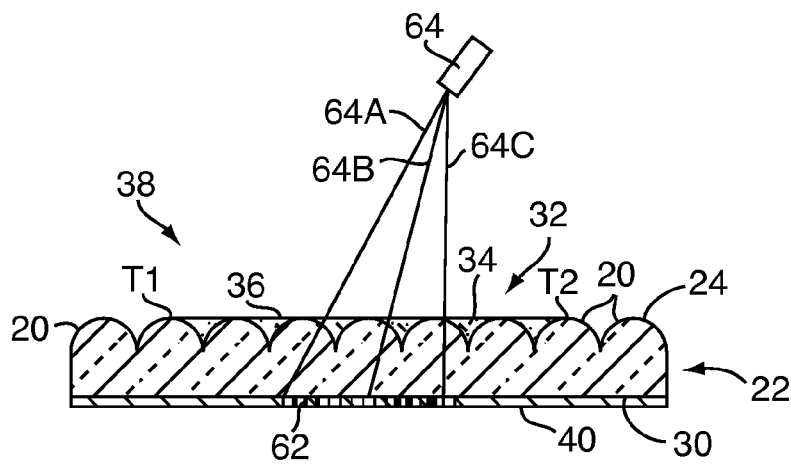
FIG. 6 is a sectional view of a scanning device used in conjunction with the lenticular product of FIG. 1 or FIG. 3 to reliably read coded data at a range of angles.
Figure 7:
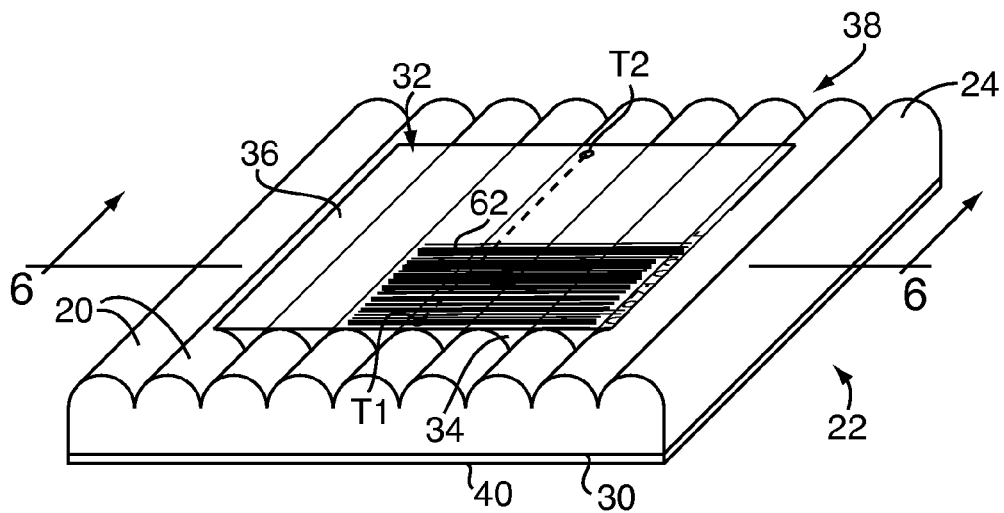
FIG. 7 is a perspective view of an article comprising a lenticular product having a substantially flat window formed on a lenticular sheet, the planar face of the sheet being furnished with a barcode, in which the bars are disposed transverse to the axes of the lenticules.
Figure 8:
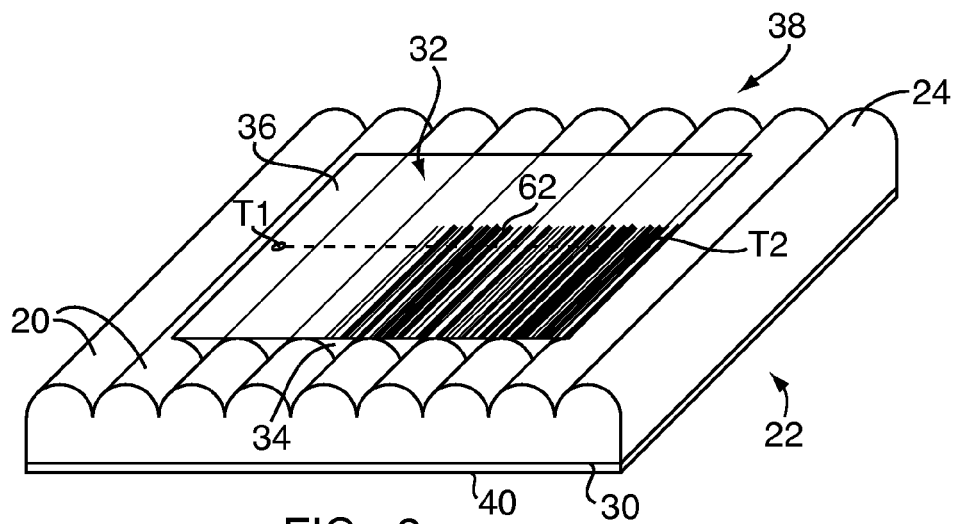
FIG. 8 is a schematic perspective view of a lenticular product having a substantially flat window formed on a lenticular sheet, a planar face of the sheet being furnished with a barcode, in which the bars are disposed parallel to the axes of the lenticules.

An underlying principle of the practice of the invention was depicted in FIG. 2. FIGS. 6-8 illustrate embodiments of the invention in which the graphical material 40 is presented at the back surface 30 of the lenticular lens 22 and includes graphical data 62 encoded as a series of bars of varying width and spacing, as in a bar code. In the schematic diagram in FIG. 6, optical scanner 64, which may include a collimated light source such as a diode laser, scans across a targeted region that includes the encoded graphical data.

Three beam paths are illustrated, 64A, 64B, and 64C, to suggest the travel of the beam across the targeted region during the scanning process. Locations T1 and T2 represent the extremes of the beam scan at the window surface 36.

It may be appreciated from the drawing that in this use of the present invention the spatial proportionality of the bar widths is preserved, and that the reading device 64 will therefore return a high degree of reliability and repeatability. It should be noted that, absent the window surface 36, any degree of obliquity in the scanner beam relative to the lenticulated surface 24 resulted in distortion of the underlying image and misreading of the encoded data.

The versatility of the invention is further illustrated in FIG. 7 and FIG. 8. FIG. 7 shows exemplary applications in which the bars in the bar code 62 are disposed in an orientation transverse to the orientation of the longitudinal cylindrical axes of the lenticules 20. Scanning beam termini T1 and T2 identify the effective traverse of the scan necessary to obtain the encoded data.

FIG. 8 shows a complementary case in which the bars in the encoded region 62 are disposed in an orientation parallel to the orientation of the longitudinal cylindrical axis of the lenticules 20. Because the portion 32 of the lenticulated surface 24 modified according to the invention provides the window surface 36, it may be appreciated that the invention allows indicia such as bar codes 62 to be assessed by an optical scanning device (not shown) in a manner analogous to that achieved in the scanning of a clear-coated printed product. The reliability rates of scanning bar codes 62 in this application therefore approximate the high reliability encountered in any conventional, unlenticulated printed product.

FIGS. 9-12 show alternate embodiments of the invention, which provide further surface qualities and enhancements of visual quality. Throughout FIGS. 9-12, the principle of the invention is extended to a two-step resin application sequence.

Figure 9:
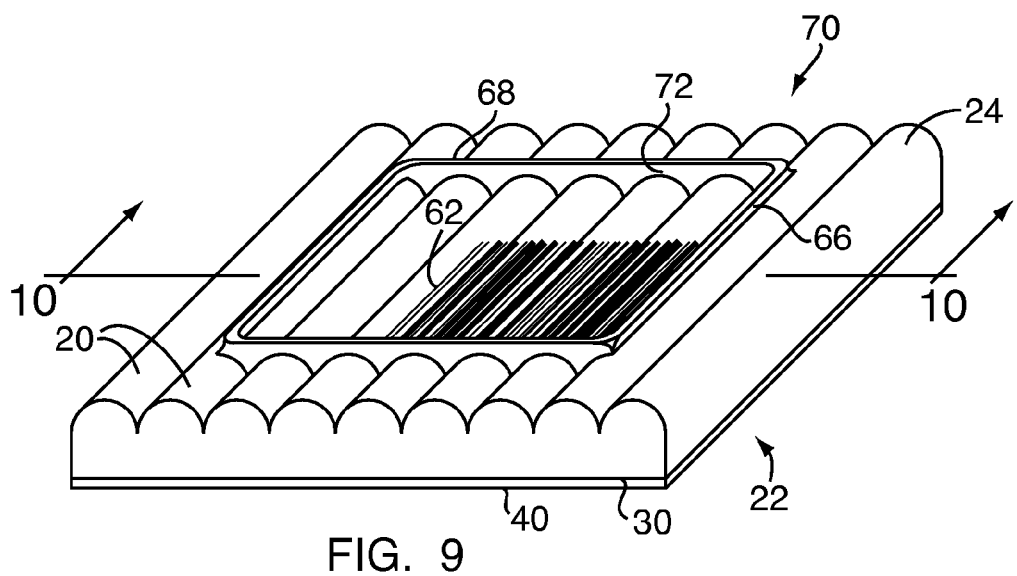
FIG. 9 is a perspective view of a lenticular sheet upon which a perimeter coating has been applied by screen printing to form a perimeter.

Referring now to FIG. 9, a resin application method such as screen printing has been employed to deposit a perimeter coating 66 in the pattern of a quadrilateral perimeter dam 68 upon the lenticulated surface 24 of lenticular sheet 22, preparatory to forming a two-stage windowed lenticular product 70. The perimeter coating 66 may have a relatively high viscosity upon application. It may be appreciated that resins in a gel state, or near gel state, can attain intimate surface contact with the lenticular sheet 22, while also retaining a high level of relief detail without immediate flow-out.

Figure 10:
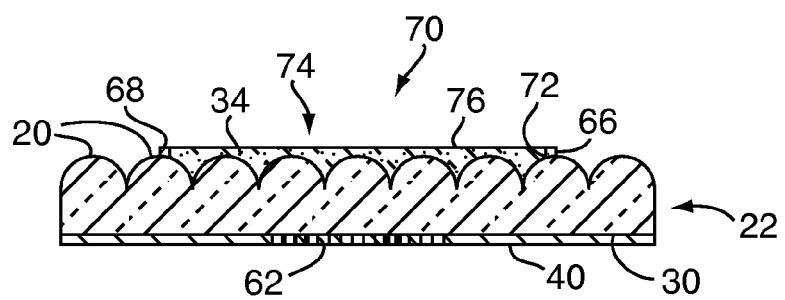
FIG. 10 is a sectional view of the perimeter of FIG. 9 having been filled to level by depositing a coating.

FIG. 10 shows a sectional view of the same region after subsequent deposition of the coating 34 into a well 72 defined by quadrilateral perimeter dam 68. In FIG. 10, the coating 34 is chosen to have relatively low viscosity, and as such can provide a filled region 74 of substantially uniform thickness having a substantially smooth and glossy window surface 76. It may be appreciated that an exceptionally low viscosity coating 34 typically imparts a particularly flat and glossy surface 76. The two-stage windowed lenticular product 70 can therefore include a particularly high quality optical window.

The combination of materials that can attain this effect is diverse. An example of a resin that can be formulated to have a relatively high viscosity is Dymax™ OP-29 Series Optical Adhesive, available from DYMAX Corporation of 318 Industrial Lane, Torrington, Conn. OP-29 Series Optical Adhesive is available as an uncured liquid resin over a viscosity range from about two thousand five hundred to about twenty thousand (2,500 to 20,000) centipoises. An example of a fluid resin of relatively low viscosity is Light-Lok™ 492, available from National Adhesives of 10 Finderne Avenue, Bridgewater, N.J., which exhibits a relatively low viscosity of eight hundred (800) centipoises in its uncured state.

The process described above need not be limited to a level meniscus; positive and negative menisci are within the scope of the process. Furthermore, the process is not limited to particular perimeter shapes such as the exemplary level or rectilinear contours shown in some preceding figures.

Figure 11:
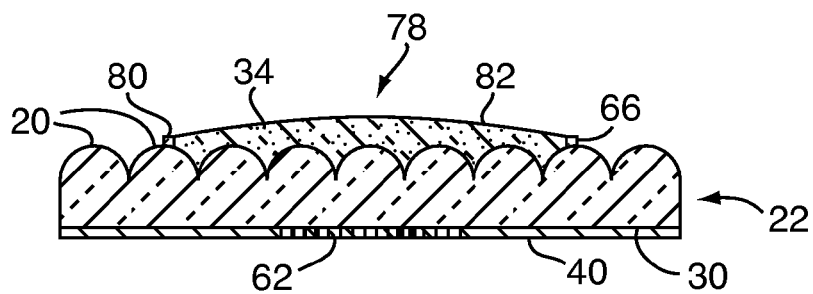
FIG. 11 is a sectional view of the perimeter of FIG. 9 having been overfilled with a coating to form a convex lens surface.
Figure 12:
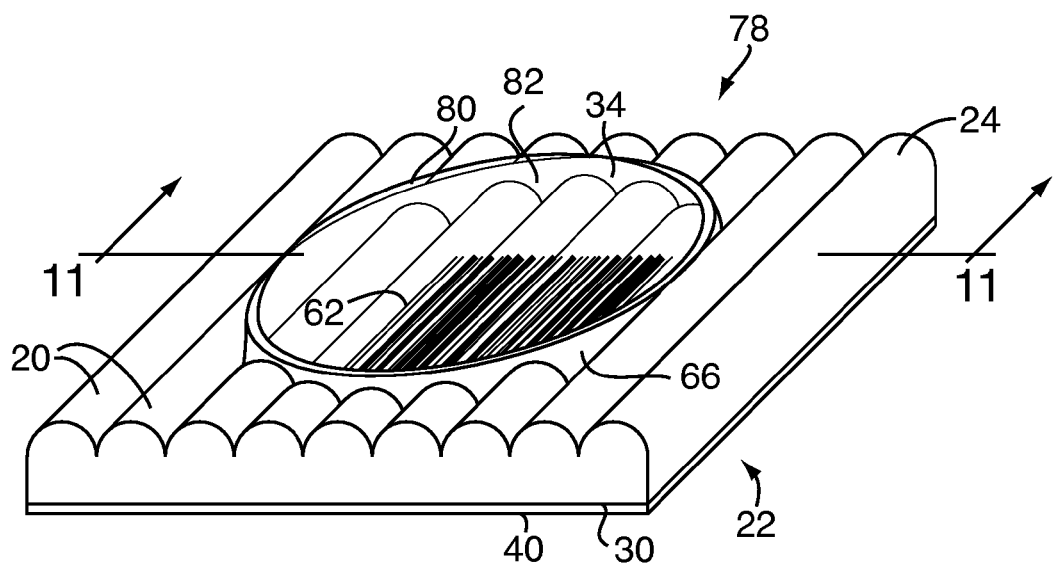
FIG. 12 is a perspective view of a perimeter compatible with the convex lens surface of FIG. 11.

Accordingly, FIG. 11 and FIG. 12 show embodiments of the present invention in which the perimeter and/or the central filled area are devised to be continuously curved to provide a superposed lens lenticular product 78. A circular perimeter dam 80 is composed of the perimeter coating 66, which has been disposed in a circular geometric pattern upon the lenticular sheet 22. The fill coating 34 is deposited within the perimeter 80 to form a positive, i.e. convex, meniscus. The coating 34 is then cured to form superposed lens surface 82.

Curing the resins results in a permanent superposed relief feature that can have optical properties apart from those implicit in the conventional lenticular structure. For example, apart from previously noted advantages of the invention, such a convex feature can provide an independent magnification property, which provides visual interest beyond that shown by the fundamental background lenticular effect.

It may be understood by the foregoing discussion and description that the present invention provides a range of novelties that can provide functional and visual effects. Although this invention has been shown and described with respect to the detailed embodiments thereof, it will be understood by those skilled in the art that various changes in form and detail thereof may be made without departing from the spirit and the scope of the invention. There are many variations and extensions of the invention, which are too many to be listed or detailed here in their entirety.

The invention is not intended to be limited in scope by the scale, proportion, or optical prescription of the lenticular lenses 20. Lenticular sheets of any pitch are suitable for use in the invention, although it may be appreciated that the volume of fluid material needed to substantially fill the valleys between the lenticules may inform the choice of material and a compatible curing strategy. Factors that may affect such a choice may include solvent evaporation, penetration of curing radiation such as UV light or electron beam energy, or surface tension, all of which may impart scale-related effects.

For further example, the coating or coatings 34, 66 deposited on the modified portion 32 may be formulated and cured to a state with residual tack, so that the function of the modified area is not primarily optical, but instead serves to provide a pressure-sensitive region so that, for example, an uncoated sheet material may be applied as a label to the surface. A label applied to a flat region may be reversibly or removably applied, and may have printing beneath which is revealed upon removal as in a lottery "scratch card". A planar window cured to a relatively hard state can be used as a reliable bearing surface for a gummed or self-adhesive label, including those printed with bar coded data. The locally flat surface can bear a removable printed material.

The modified portion 32 need not be used only for viewing reverse-printed graphic matter, as in the conventional lenticular printing practice, but can also provide a surface amenable to face printing upon an otherwise unreceptive lenticulated surface. The face-printed region can have a higher resolution than that exhibited throughout the lenticulated region or regions, irrespective of whether the printing is located on the reverse of the lenticulated side of the sheet, or directly upon the area modified by the application of resin. If two resins are used successively, they may be cured separately, or in a common curing phase. Differing variations of the invention may be combined in one sheet of material.

Although for clarity of description, the perimeter is shown herein as having an effectively constant dimension, in practice, width of the perimeter dam need not be uniform about the perimeter. Indeed, the inner periphery of the perimeter dam can suffice to retain the clear coating and to delimit the filled region 74 or the lens surface 82, while the outer periphery or contour of the perimeter dam can be freely devised to form a larger pattern of widely varied design. As a simple example, an alternate version to the raised circular feature shown in FIGS. 11 and 12 might be formed having the same circular inner periphery, but might be devised in its outer periphery to exhibit a raised, surrounding contour pattern of radiating rays.

As another example, the perimeter need not be a completely or substantially closed curve, but can be an open curve, arc, or segment such that the clear coating can at least minimally flow outward from an opening of the perimeter dam.

It is understood that in theory a refractive index match is necessary for a complete removal of the optical boundary between the prefabricated lenticules and the applied resin, however, it has been found that a perfect match is not essential for the successful application of the invention. It should also be appreciated that a coating in a fluid state usually will exhibit a different, typically lower, refractive index than in its final cured state. These parameters are well understood, and neither of these factors should be taken to limit the practicability or utility of the invention.

The graphic material may be prepared and composed in diverse ways well known to those practiced in the art. Since in the interest of brevity it is impossible to describe all the accumulated knowledge in the graphic arts, or even within lenticular printing, it may be said generally that no previously known preparation, composition, or disposition of graphic matter for either lenticular or conventional printing, either alone or in combination, should be taken to be unanticipated by the present invention.

The invention should therefore not be taken to be limited by any constraints necessitated by the practical summary of the invention provided by this specification and the accompanying drawings, but should instead be understood to defined by the maximum reach of the appended claims.

The invention claimed is:

1. A lenticular product comprising:
   a uniform lenticular sheet having a back surface and a front surface, the front surface having lenticules defining vertices and valleys therebetween, wherein the back surface has graphic material including an image; and
   a clear coating deposited on a portion of the front surface that is less than the entire front surface, thereby resulting in adjacent lenticules being free of coating, the clear coating at least substantially filling the valleys of the lenticules within the portion to form a filled region having a surface that is substantially tangent to the vertices of the lenticules, wherein the lenticules above the image remain intact;
   wherein the image on the back surface is in substantial registration with the clear coating portion formed on the front surface resulting in the image being viewable through the clear coating without lenticular distortion while the surrounding graphic material of the back surface that is viewable through the lenticules that are free of the clear coating exhibits a lenticular effect;
   wherein the clear coating is deposited within a perimeter formed of a perimeter coating that forms an upstanding, closed perimeter wall that extends above the front surface, the clear coating having a thickness that results in the clear coating extending above the front surface but being contained by the perimeter wall.

2. The lenticular product according to claim 1, wherein the filled region has a first refractive index substantially similar to a second refractive index of the lenticular sheet.

3. The lenticular product according to claim 1, wherein the filled region defines a window surface disposed substantially tangent to the vertices of the lenticules.

4. The lenticular product according to claim 1, wherein the filled region defines a raised window surface disposed substantially above the vertices of the lenticules.

5. The lenticular product according to claim 1, wherein the filled region defines a lens surface that is concave toward the back surface.

6. The lenticular product according to claim 1, wherein the filled region defines a lens surface that protrudes convexly beyond the vertices of the lenticules.

7. The lenticular product according to claim 1, wherein the perimeter wall has an inner periphery and an outer periphery defining therebetween a width that is substantially uniform along the perimeter.

8. The lenticular product according to claim 1, wherein the perimeter has an inner periphery delimiting the filled region and an outer periphery devised to exhibit a contour pattern different in shape from the inner periphery.

9. The lenticular product according to claim 8, wherein the contour pattern is a star shape.

10. The lenticular product of claim 1, wherein the image comprises a bar code.

11. The lenticular product of claim 1, wherein the lenticular effect of the lenticules that are covered with the coating is suppressed.

12. A method for making an article comprising a lenticular product, the method comprising the steps of:
    using a screen printing process to deposit a perimeter coating on a lenticulated surface of a lenticular sheet so that the perimeter coating at least substantially fills valleys of the lenticulated surface and projects upwardly from the lenticulated surface to form a closed, upstanding perimeter wall; and
    depositing a clear coating within a space formed between the perimeter wall so that the clear coating at least substantially fills valleys of the lenticulated surface and extends above the lenticulated surface to form a filled region, the clear coating being contained by the perimeter wall, wherein the lenticules within the filled region remain in tact;

wherein the perimeter coating that forms the perimeter wall is only formed on a portion of the lenticulated surface that is less than the entire lenticulated surface, thereby leaving surrounding lenticules outside the perimeter coating are free of the clear coating.

13. The method according to claim 12, further comprising the preceding steps of:

identifying a first refractive index of the lenticular sheet; and selecting the clear coating to have a second refractive index substantially similar to the first refractive index.

14. The method according to claim 12, further comprising the steps of:

affixing graphic material that includes an image to a substantially flat surface of the lenticular sheet opposite the lenticulated surface, the image being in substantial registration with the filled region, whereby the image is viewable through the filled region without lenticular distortion, while surrounding graphic material exhibits a lenticular effect as a result of being viewed through lenticules that are free of the clear coating.

15. The method of claim 12, wherein the image comprises a bar code.

16. The method of claim 12, wherein a first material is used to form the perimeter coating and a second different material is used to form the clear coating, wherein a viscosity of the first material is greater than the second material.

17. The method of claim 16, wherein the first and second materials comprise resins that are cured successively and separately.

\* \* \* \* \*